United States Patent [19]

Kruse

[11] Patent Number: 5,134,349
[45] Date of Patent: Jul. 28, 1992

[54] TWO-PHASE BRUSHLESS DC MOTOR CONTROLLER

[76] Inventor: David L. Kruse, 25222 Vespucci Rd., Laguna Hills, Calif. 92653

[21] Appl. No.: 706,167

[22] Filed: May 28, 1991

[51] Int. Cl.[5] .............................................. H02P 6/02
[52] U.S. Cl. ................................... 318/254; 318/138; 318/439
[58] Field of Search ............... 318/138, 254, 439, 685, 318/696, 293

[56] References Cited

U.S. PATENT DOCUMENTS

| | | | |
|---|---|---|---|
| 4,387,326 | 6/1983 | Ray et al. | 318/138 |
| 4,584,506 | 4/1986 | Kaszmann | 318/254 |
| 4,612,486 | 9/1986 | Ban et al. | 318/254 |
| 4,928,046 | 5/1990 | Karasawa | 318/654 |

Primary Examiner—Bentsu Ro
Attorney, Agent, or Firm—G. Donald Weber, Jr.

[57] ABSTRACT

Control circuits for operating a two-phase brushless dc motor from a a dc power source are described. Control of the motor is optimized by detecting induced back EMF of the two phases to sense rotor phase position. It is common knowledge that the voltage developed across the terminals of a permanent magnet motor can be represented by a winding resistance, a winding inductance and a generated back EMF. In two-phase brushless dc and permanent magnet stepping motors, the induced back EMFs of the two phases are displaced from each other by 90 electrical degrees. Thus, by detecting the back EMFs of the two phases, an accurate relative position of rotor-to-stator can be determined at any rotor position. Commutation of the motor phases and closed loop control of the motor and load is achieved by accurately sensing the back EMFs of the two phases. Also, phase position of the permanent magnet rotor plates is detected by integrating the sensed back EMFs of the two phases to produce quadrature sinewaves the magnitudes of which are constant relative to rotor speed.

11 Claims, 3 Drawing Sheets

TWO-PHASE BRUSHLESS DC MOTOR CONTROLLER

BACKGROUND

1. Field of the Invention

This invention relates, generally, to the control of dc motors which are electronically, rather than mechanically, commutated and to the control of 2-phase, permanent magnet, brushless DC motors, in particular.

2. Prior Art

In motion control applications requiring high performance, incremental motion, the prime mover should possess highly linear torque characteristics versus applied current and a high resolution position feedback signal should be provided. Most applications require that these characteristics be met over a wide range of speeds with low ripple torque content, low audible noise, high power conversion efficiency and efficient thermal dissipation.

In the field of high performance, incremental motion control, the most commonly used motor technology is the dc servo motor with an integral encoder providing position feedback. The straight forward and well defined control criteria is the primary reason for the popularity of such motors. The motor is self-commutating, requiring that only a dc voltage (or current) be applied across a single pair of terminals to produce a torque to drive the load.

Unfortunately, this motor technology is relatively poor in reliability (due to brush/commutator wear), thermal characteristics (because it is rotor wound) and in terms of price/performance characteristics.

Alternative, but much less commonly used, motor technologies include the brushless DC (BLDC) and permanent magnet (PM) stepper type motors. Though different in construction, these two motor types are similar in that they contain permanent magnet rotors with wound stators and they must be electronically commutated. The range of applications of these types of motors has previously been limited by the difficulty in commutation while still requiring a high resolution position encoder to achieve a high level of performance. Also, they suffer from such undesirable characteristics as high torque ripple, high audible noise, as well as low and mid-range resonances. However, the thermal characteristics thereof are superior to the dc servo motor (because they are stator wound), the reliability is superior (because there are no brush or commutator segments to wear out) and the price/performance characteristic is better. Moreover, electromagnetic interference is significantly reduced by the elimination of mechanical commutation.

BLDC motors are most commonly supplied in a 3-phase (Wye or Delta) configuration with Hall sensors imbedded in the motor to define commutation positions for each phase. The three phases are displaced 120 electrical degrees from each other. If the torque profiles of the individual phases are sinusoidal and the Hall sensors are ideally located, a ripple torque of about 14% of the output torque results. However, the Hall sensors are difficult to align, resulting in significantly more torque ripple thereby producing poor torque linearity, high audible noise and degraded power conversion efficiency. Thus, these motors are limited to high speed, low performance applications unless a high resolution encoder and fairly complex control algorithms are used.

Stepper motors are most commonly supplied in 2-phase configurations. (Four-phase configurations are also common. However, these are the same as 2-phase with different lead wire connections.) The phases in these motors are displaced by 90 electrical degrees from one another. They are commonly used in low performance, open-loop positioning applications. Control strategies include (in order of increasing performance) full, half and micro-stepping modes. Full and half-step modes are simple and inexpensive to implement, but suffer from high torque ripple, high audible noise, as well as low and mid-range resonances. Micro-stepping overcomes many of the undesirable characteristics, but at the expense of complexity and cost. However, in all of these operating modes the motor must be overdriven to insure reliable positioning; performance is dependent on constant or well behaved mechanical loads; and the torque-speed range is significantly less than that achievable under closed-loop control.

While the constructions and typical applications of the 2-phase BLDC and stepper motors differ vastly, the optimum control requirements therefor are strikingly similar. Simply stated, the two phases must be excited with sinusoidal currents which are in-phase with the respective torque profiles, where the resultant torque produced is linearly related to the magnitudes of the excitation currents. The two motor types complement each other well toward providing a wide range of torque/speed capabilities. The difference in the effective torque/speed ranges of the two is generally attributable to the electrical pitch (or commutation rate) of the motor phases.

Prior art technology in the field of closed loop control using induced EMF sensing is best represented by U.S. Pat. Nos. 4,275,343 and 4,455,513. However, the technology described in these patents (as well as other known technology) suffers from several performance limitations. For example, the known controllers do not maintain accurate position information in speed ranges down to, and including, zero velocity. The known systems also require a low-performance, open-loop, start-up sequence which is undesirable in many applications. Moreover, the prior art systems generally operate to commutate the motor with square waves of voltage or current which is quite limiting. Furthermore, the known systems do not accurately cancel variations in motor winding resistance, inductance and/or back EMF.

As a result, the best known technology currently in existence does not use the sensed position signals to achieve high performance position and velocity control in an effective, cost efficient manner.

PRIOR ART STATEMENT

The most significant references uncovered during a patent-ability search are listed herewith.

U.S. Pat. No. 4,275,343; D. Fulton et al; "Back EMF Controlled Permanent Magnet Motor". This patent discloses a system wherein excitation of the motor is controlled as a function of back EMF.

U.S. Pat. No. 4,490,661; L. Brown et al; "Control System For Synchronous Brushless Motors Utilizing Torque Angle Control". This patent discloses the concept of motor control based on a back EMF function.

U.S. Pat. No. 4,459,519; D. Erdman; "Electronically Commutated Motor Systems and Control Therefor". This patent discloses a brushless DC motor which is controlled by a system which includes integrating the back EMF signal to determine relative position of motor elements.

U.S. Pat. No. 4,492,903; J. Knight et al; "Optimum Efficiency Brushless DC Motor". This patent discloses a two-phase brushless DC motor which relies on the principle that the magnetic field produced in the rotor is aligned 90 degrees to the stator.

U.S. Pat. No. 4,447,771; J. Whited; "Control System For Synchronous Brushless Motors". This patent discloses the concept of motor control as a function of back EMF.

U.S. Pat. No. 4,662,358; D. Farrar et al; "Electronic Control System For A Cardiac Prosthesis". This patent discloses the principle of using back EMF to control commutation in a brushless DC motor.

U.S. Pat. No. 4,651,069; G. Pellegrini; "Back EMF Brushless DC Motor Drive Circuit". This patent discloses the principle of using back EMF voltage to generate control potentials in a three-phase permanent magnet motor.

U.S. Pat. No. 4,403,177; H. Weber et al; "Brushless Three-Phase Direct Current Motor Control Circuit". This patent discloses a back EMF used in a brushless three-phase DC motor.

U.S. Pat. No. 4,169,990; D. Lerdman; "Electronically Commutated Motor". This patent discloses control means for brushless DC motors used in appliances and which use sensed back EMF to regulate the commutating circuit of the motor.

SUMMARY OF THE INSTANT INVENTION

This invention relates to a control circuit which uses the back EMFs of a 2-phase, brushless DC motor to develop precise rotor position signals. Furthermore, the circuit uses these signals to excite the motor with currents of such magnitude and phase as to deliver torque to the load with optimum efficiency. The invention uses the developed rotor position signals to provide precise, closed-loop control of the position and velocity of the motor.

The motor can be any two-phase, brushless DC type with a permanent magnet rotor wherein the generated torque is a function of the excitation currents in the two phases and the relative position of rotor to stator. Typically, the motor is operated in two modes. The first mode (RUN) is used to drive the motor at non-zero velocity. The second mode (HOLD) is used to drive the motor so as to maintain position at zero velocity.

In the RUN mode the currents applied to the motor phases are in phase with the respective torque profiles whereby motor torque is controlled by varying the magnitudes of the phase currents. Therefore, the torque ripple is theoretically zero and the motor efficiency is optimum.

In the HOLD mode the currents applied to the motor phases are arranged to be 90° displaced from the respective torque profiles so that a restoring torque is applied by the motor for any non-zero position error at any rotor position. Meanwhile, the integrity of the rotor position signals is maintained, enabling uninterrupted closed-loop control at all motor velocities.

The equivalent circuit of a motor phase contains a resistance, an inductance and a back EMF. In order to detect the back EMF from the total voltage dropped across a motor phase, it is necessary to extract the voltage drops across the inductive and resistive components. The voltage dropped across the resistive component is extracted by transformer coupling the drive winding to the sense winding. The voltage dropped across the inductive component is extracted by subtracting the weighted components of the sensed current from the integral of the sense winding output voltage. The result is a phase position signal which is the integral of the back EMF voltage of that phase. The phase position signals of the two phases are used to electronically commutate the motor and to control velocity and position.

This circuit develops the phase position signals (PPS). These PPS signals are used to provide position feedback in high performance position and velocity control. In addition, the motor is optimally commutated by properly routing and attentuating the PPS signals. That is, by applying the phase position signals to respective transconductance amplifiers, the proper torque is realized. The integrated EMF of phase A can be used as the input signal to a current error amplifier of phase B, and vice versa, to generate torque output of the motor during the RUN mode. Similarly, by applying the integrated EMF of phase A to the current amplifier for phase A and the integrated EMF of phase B to current amplifier for phase B, the proper torque is realized to provide the position restoring torque required in the HOLD mode. Motor torque output is controlled by manipulating attenuation and polarity of the two developed position signals.

It should be noted that while the electrical pitch n of BLDC type motors is typically on the order of 3 to 4 (cycles per revolution), it is typically on the order of 12 to 100 for the most common (7.5 to 0.9 degree/step, respectively) PM and Hybrid Stepping motors. It is for this reason that the two motor types applicable to this invention complement each other so well. That is, the BLDC motor has an extremely high torque/speed range and the stepping motor has an exceptional positioning resolution.

DESCRIPTION OF THE PREFERRED EMBODIMENT

Figure 1:
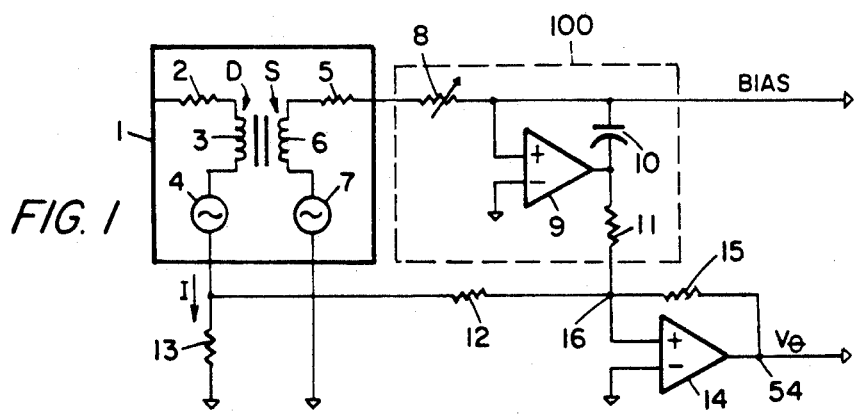
FIG. 1 is a schematic diagram of one embodiment of a phase position detector circuit of the instant invention.

In order to better understand the invention, some background discussion is believed to be useful before the circuits, per se, are discussed. Per Faraday's law of electromagnetic induction, a coil linked by a changing magnetic field has induced in it an EMF which is proportional to the rate of change of flux of the magnetic field. In a two-phase, permanent magnet, brushless DC motor containing n permanent magnet pole-pairs, the EMFs induced in the two phases are rotor position angle ($\theta$) dependent sinusoids which are related in phase by 90-electrical degrees and whose magnitudes are proportional to rotor angular velocity ($w = d\theta/dt$) and EMF constant of proportionality $k_e$, i.e.

$$Vemfa = k_e w \sin n\theta \qquad (1)$$

and $$Vemfb = k_e w \cos n\theta \qquad (2)$$

The torque produced by the motor is the sum of the torques produced by the two phases. These torques are functions of the respective phase excitation currents (Ia and Ib) and torque sensitivities. The torque sensitivity of each phase is a position-angle dependent sinusoid the magnitude of which is equal to the torque constant of proportionality (kt) and the phase of which is in-phase with its induced EMF, i.e.

$$T = I_a(k_t \sin n\theta) + I_b(k_t \cos n\theta) \qquad (3)$$

By sensing and integrating the induced EMFs of the two phases, a derivation of rotor position is achieved in the form $$V_{\theta A} = -(k_e/n)\cos n\theta \qquad (4)$$

and $$V_{\theta B} = (k_e/n)\sin n\theta \qquad (5)$$

Furthermore, this rotor position information can be used to control the excitation currents in the two phases so as to achieve the characteristics required of high performance incremental motion control applications.

In the RUN mode the phase excitation currents are controlled as:

$$I_a = KV_{\theta B} \text{ and } I_b = -KV_{\theta A}$$

Therefore, the torque produced by the motor is:

$$\begin{aligned} T &= (Kk_t k_e/n)(\sin^2 n\theta + \cos^2 n\theta) \\ &= Kk_t k_e/n \end{aligned} \qquad (6)$$

which is linearly related to gain term K.

In the HOLD mode, the phase excitation currents are controlled as:

$$I_a = KV_{\theta A} \text{ and } I_b = KV_{\theta B}$$

and the torque produced by the motor is:

$$\begin{aligned} T &= (Kk_t k_e/n)[\sin n\theta \cos n(\theta - \theta_e) - \\ &\quad \cos n\theta \sin n(\theta - \theta_e)] \\ &= (kk_t k_e/n)\sin n\phi_e \end{aligned} \qquad (7)$$

serving to apply a holding torque to counteract any rotor position error $\theta_e$.

The circuit of this invention develops and uses these phase position signals as position feedback in high performance position and velocity control and to optimally commutate the motor by proper routing and attenuation. That is, by applying $V\theta A$ and $V\theta B$ to appropriate amplifiers, the torque equation (6) is achieved during the RUN mode. Similarly, by applying $V\theta A$ and $V\theta B$ to the appropriate amplifiers, the torque equation (7) is realized, providing the position restoring torque required of the HOLD mode.

Referring now to FIG. 1, there is shown a schematic diagram of a preferred embodiment of a phase position detection circuit used in the instant invention. In particular, this circuit is utilized to detect back EMF's generated by each of the two motor phases. In high performance incremental motion control systems, where the position feedback must be precise, the sensing of back EMF requires accurate cancellation of the voltages developed across both the resistance R and inductance L of the excited drive windings. This effect is achieved by the present invention as shown in the schematic diagram of FIG. 1. The equivalent circuit of each motor phase 1 includes a drive (primary) winding D having components of resistance 2, inductance 3 and back EMF voltage generator 4.

In the preferred embodiment of the present invention, each motor phase also includes a sense (secondary) winding S which is transformer coupled to the drive winding. The equivalent circuit of the sense winding includes components of resistance 5, inductance 6 and back EMF voltage generator 7. The voltage coupled to the sense winding includes only that voltage which is developed across the drive winding inductance 3. Thus, the voltage developed across the primary winding resistance 2 is eliminated. This also eliminates the uncertainty created by the variation in the resistance 2 due to initial tolerance, as well as temperature variations. Inasmuch as the impedance of the load, represented by resistor 8, is very large compared to the impedance of the sense winding, the effects of secondary winding inductance and resistance are insignificant.

The resultant voltage across the sense winding is the sum of two components. A first component, the voltage developed across the drive winding inductance (Ldi/dt), is the product of the derivative of current d in the drive winding and the proportionality constant of inductance L. The second component (Vemf) exhibits both magnitude and frequency which are directly proportional to motor angular velocity.

The sense winding is referenced to the circuit common, thereby providing a single-ended output. This output is applied to the input of an active integrator 100 comprising operational amplifier 9, input resistor 8 and feedback capacitor 10. The output of the integrator relative to the first component (Ldi/dt) is proportional to drive winding current (L*I). The output of the integrator relative to the second component (Vemf) is delayed in phase by 90 electrical degrees and its magnitude is independent of rotor velocity.

The output of the active integrator 9 is applied to the summing junction 16, defined by resistors 11 and 12 where the weighted component [R13*I] of drive winding current, with the weighting factor provided by sense resistor 13, is added to the integrator output, as ratioed by resistors 11 and 12. The resultant output of the summing junction is applied to buffer amplifier 14 and the associated feedback resistor 15.

The adjustability of input resistor 8 serves to adjust the gain of the integrator to accommodate the combined tolerance range of motor winding inductance and integrator 100 capacitance. Thus, resistor 8 adjusts the ratio of the two inputs applied to the summing junction 16 for precise cancellation of the component of voltage developed across the drive winding inductance 3. This operation causes the output signal $V\theta$ to be independent of motor excitation. Proper adjustment of resistor 8 is accomplished by locking the rotor and minimizing the amplitude of the $V\theta$ output at terminal 54 in response to an AC current induced in the drive winding. The appropriate frequency and amplitude of this AC current is dependent on the electrical characteristics of the motor.

In that this adjustment also negates tolerance stack-ups of the winding inductance and the integrator feedback capacitor 10, the balanced characteristics of the two phases are exploited. That is, even though the amplitudes of the two phase position signals (VOA and VOB) can be shown to be directly proportional to the motor voltage constant Ke and inversely proportional to winding inductance L, they will be substantially matched [MAG (VOA)=MAG (VOB)] if the inductance component of each is accurately extracted because the characteristics of the two phases of any given motor are closely matched. (La=Lb and Kea=Keb). These signals are adaptively scaled by the control processor as described later in the discussion of FIG. 2.

This arrangement substantially improves on the prior art which employs back EMF sensing where a substantially larger number of reactive components are used. That is, reactive components are characteristically imprecise with tolerances of 5-10%. (Resistors tend to have tolerances on the order of 1%.) Thus, the tolerances of these additional components stack up and add to the already imprecise characteristics of the motor. Typical combined variations from nominal due to initial tolerance variations for resistance and inductance and due to temperature variations can be on the order of +/−50%. These characteristics result in imprecise phase position detection of the motor.

Mathematically, the overall transfer function for the phase position detection circuit shown in FIG. 1 can be written as:

$$V\theta(s) = -R15 \ [R13/R12 - L/(C10*R8*R11)]I(s) - [1/(C10*R8*R11)]Vemf(s)/s$$

However, if $R13/R12 = L/(C10*R8*R11)$, this reduces to:

$$V\theta(s) = [R15/(C10*R8*R11)]Vemf(s)/s$$

or in terms of the motor parameters $$V\theta(s) = (R15*R13/R8*n)(Ke/L)Vemf(s)/s$$

The invention uses an active (rather than a passive) integrator because it more accurately approximates the ideal integrator function. However, due to the characteristic input offset voltage [Vi(os)] and input bias current [I(bias)] of the operational amplifier, the output of the integrator tends to drift and is bounded only by the supply rails. In many high performance incremental motion control applications, this tendency cannot be adequately compensated for by using passive feedback compensation since it degrades the otherwise ideal characteristics of the active integrator. However, in this embodiment, this tendency is compensated for by the bias circuit consisting of resistor 8 and the BIAS input. The output offset which must be compensated is dependent on the input offset voltage Vi(os) and input bias current I(bias) of integrator operational amplifier 9 as well as the leakage current of feedback capacitor 10. The BIAS signal required to null the cumulative offsets is calibrated by the processor using the position signal $V\theta$ as feedback (See FIG. 7).

This calibration is initially performed while the motor is at rest and the ac component of current in the drive winding is zero. Typically, the largest contributor to integrator offset is the input offset voltage Vi(os).

If the bias control signal generated by the processor 42 (see FIG. 2) has a resolution of +/−1% and the op amp input offset voltage is 5 mV, the input offset can be nulled to within 50 $\mu$V. A typical integrator application might have an equivalent input resistance 8 of 10K ohms and a feedback capacitance 10 of 0.1 $\mu$F, for which the rate of change of output voltage would be 50 mV/sec.

The bias servo is in operation during both RUN and HOLD modes of operation. In the RUN mode the offset is nulled by detecting the peaks of the position signals. Since the sum of the positive and negative peaks equals the offset, the offset is nulled when the sum of the peaks equals zero. Thus, this invention employs an active feedback compensation implemented by the control processor 42 which will be discussed during the description of the control circuit shown in FIG. 2.

Figure 2:
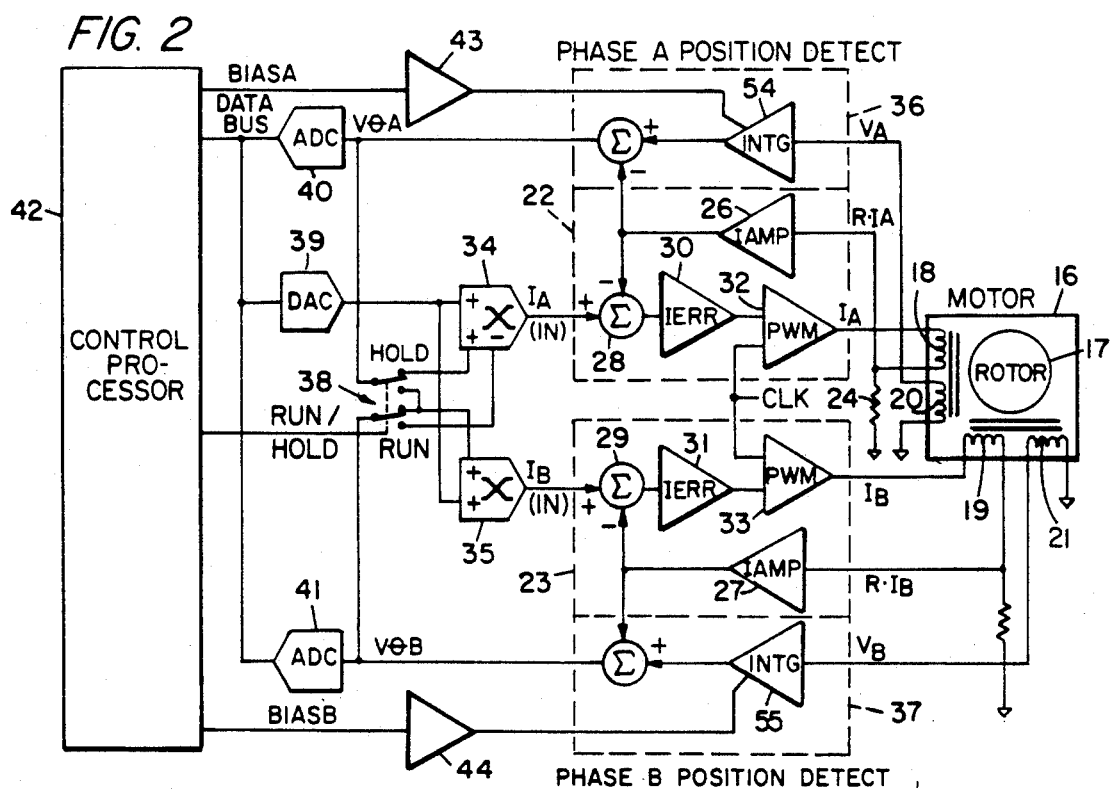
FIG. 2 is a block diagram of one embodiment of the control circuit of the instant invention.

Referring now to FIG. 2, there is shown a block diagram of a preferred embodiment of a control circuit embodying the present invention. This control circuit is primarily directed to use with a 2-phase, permanent magnet, BLDC motor and uses the phase position detection circuit shown in FIG. 1. The control circuit for each phase of the motor contains a power amplifier (SSA), a phase position detector circuit, a four-quadrant multiplier, an integrator bias circuit, and processor interfaced A/D and D/A converters.

A representative BLDC motor 16 includes a permanent magnet rotor 17, drive windings 18 and 19 and sense windings 20 and 21. Drive windings 18 and 19 operate on phases A and B, respectively. Sense windings 20 and 21 are transformer coupled to drive windings 18 and 19, respectively. Thus, sense windings 20 and 21 also operate on phases A and B, respectively. Phase A is shown and defined to have a phase relationship of 90 electrical degrees relative to phase B.

The excitation currents IA and IB in drive windings 18 and 19, respectively, are regulated by switching servo amplifier (SSA) circuits 22 and 23, respectively. The SSA circuits 22 and 23 comprise current sense resistors 24 and 25, current sense amplifiers 26 and 27, summing junctions 28 and 29, current error amplifiers 30 and 31 and pulse width modulated (PWM) power amplifiers 32 and 33, respectively.

Conventional SSA circuits 22 and 23 (or devices) of satisfactory performance are known in the art and need not be described in detail. The devices 22 and 23 provide precision bi-polar currents IA and IB to the inductive loads represented by the respective drive windings 18 and 19. The currents are produced in response to input signals Ia(IN) and Ib(IN) which are supplied from the multipliers 34 and 35 tot he summing junctions 28 and 29, respectively, within the SSA devices. The performance requirements of the SSA devices include sufficient gain and bandwidth for high responsiveness to variations in load, including sufficiently high drive voltage, current and PWM clock frequency to convert the input signals to the respective motor excitation currents. Linear transconductance amplifiers may also be used. However, the characteristic inefficiency thereof is not in keeping with the goals of the present invention.

Motor position signals VθA and VθB are developed by a pair of phase position detector circuit of the type shown in FIG. 1. These detector circuits are shown here as integrator/summer blocks 36 and 37. As noted, the effects of the equivalent winding resistance and inductance are extracted by these circuits leaving only the back EMF contribution.

In a preferred implementation, advantageous components are used. For example, the power amplifiers are T-type or full-bridge bipolar switching servo amplifiers. The active integrators 54 and 55 possess the desirable characteristics of low input offset voltage and high input impedance. Integrator feedback components are chosen to yield a time constant as large as possible. In this implementation the integrator bias and four-quadrant multiplication functions are performed by the integrators 54 and 55 and the multipliers 34 and 35, respectively using pulse width modulation techniques. These functions could also be performed using standard D/A converters, as long as the four quadrant multiplication function is not violated.

Figure 3:
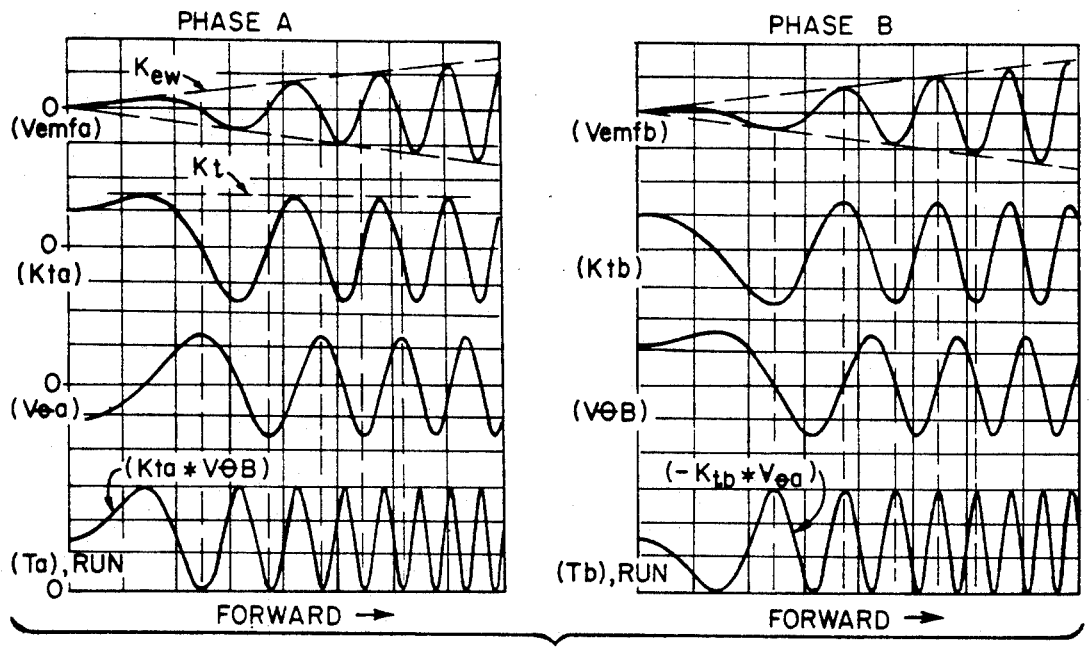
FIG. 3 is a graphic representation of 2-phase motor characteristics.

Referring to FIG. 3, there are shown the back EMF's generated by the two motor phases [designated here as V(emfa) and (Vemfb)] while under constant motor acceleration from zero angular velocity. It is noted that the generated EMF's are position-angle ($\theta$) dependent sinusoids whose angular phase relationship to one another is 90 electrical degrees. It is seen that phase A leads phase B in one direction of motor velocity while phase B leads phase A in the other direction. The magnitudes of the signals are directly proportional to motor angular velocity w (radians/second) and generator constant of proportionality Ke (Volt-seconds/radian). The frequencies are directly proportional to motor angular velocity with electrical pole pitch multiplier n (electrical cycles/-revolution). Now, if the motor is at some non-zero velocity and if the back EMF's of the two phases are integrated by a phase position detector as shown in FIGS. 1 and 2, sinusoidal phase position signals, VθA and VθB, shown in FIG. 3, are generated. The position-angles of these signals are delayed by 90 electrical degrees relative to the respective back EMF signals. In addition, the amplitudes [(R15*R13/R8*n) (Ke/L)] are independent of motor angular velocity. The phase position signals are fed back to the inputs Ia(IN) and Ib(IN) of the SSA devices 22 and 23 via four-quadrant multipliers 34 and 35 as appropriately routed by DPDT mode control switch 38. The switch 38 is controlled by the RUN/HOLD signal from the control processor 42 as described infra.

In the RUN mode, the phase position signal VθA is routed to the Ib(IN) input of SSA device 23 via four-quadrant multiplier 35. In addition, phase position signal VθB is routed to the Ia(IN) input of SSA device 22 via four-quadrant multiplier 34. As shown in FIG. 3, the torque sensitivities of the two phases (Kta and Ktb, respectively) are position-angle dependent sinusoids of magnitude Kt which are in position-angle agreement with their respective back EMFs.

Also, the phase position signal produced by the leading phase (VθB) is in position-angle agreement with the torque sensitivity of the trailing phase (Kta), while the phase position signal of the trailing phase (VθA) is 180 electrical degrees out of position with the torque sensitivity of the leading phase (Ktb).

As routed by the mode control switch 38, the phase position signals control the excitation currents in the two phases to be in position angle agreement with their respective torque sensitivities. The torque produced by each phase of the motor is the product of the excitation current and the torque sensitivity in that phase. Therefore, the torque produced by phase B is proportional to the square of the cosine of the position angle (n$\theta$). Likewise, the torque produced by phase A is proportional to the square of the sine of the position angle. Furthermore, the total torque produced by the motor is the sum of the torques produced by the two phases. Thus, the total torque produced by the motor is proportional to the sum of the squares of the sine and cosine (See equation 6 above). It is, therefore, caused to be independent of motor angular position and velocity. The four-quadrant multipliers 34 and 35 serve to control the magnitudes and polarities of the phase position signals as applied to the SSA devices. Thus, the torque produced by the motor [(R15*R13/R8*n) (Ke/L)Kt*Vdac] is bidirectional and is proportional to the output from the control processor 42 as provided via the DAC 39.

Figure 4:
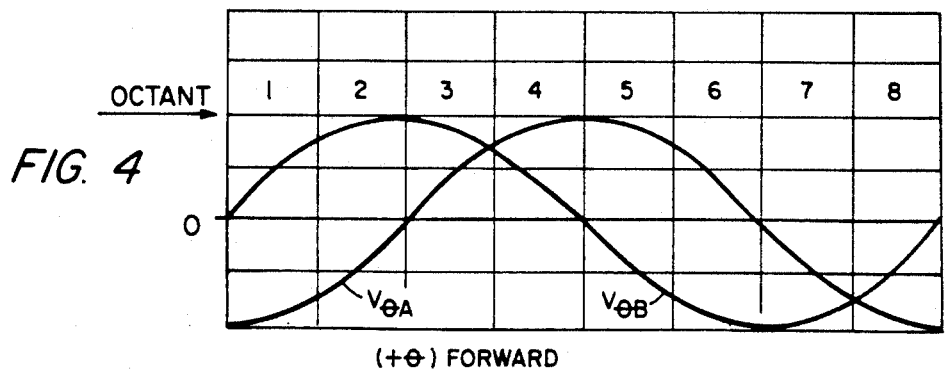
FIG. 4 is a graphic representation of motor position as a function of phase position signals.

The phase position signals (VθA and VθB) are applied to the control processor 42 via analog-to-digital converters 40 and 41, respectively, providing the position feedback required in high performance motion control applications. From these signals the control processor 42 calculates linear position of the motor ($\theta$). This is accomplished by dividing each cycle of the phase position signals into octants as shown in FIG. 4. The number of octants (N) traversed by the phase position signal is accumulated in memory and is a coarse measure of rotor position.

The number of octants (N) is then operated on by a vernier motor position calculation with an algorithm which is octant dependent as shown in the condition table (See Table 1).

TABLE 1

| OCTANT | VθA | VθB | VθA <> VθB | Θ (radians) |
|---|---|---|---|---|
| 1 | − | + | > | [N*PI/4 − tan$^{-1}$ (VθB/VθA)]/n |
| 2 | − | + | < | [(N + 1)*PI/4 + tan$^{-1}$ (VθA/VθB)]/n |
| 3 | + | + | < | [N*PI/4 + tan$^{-1}$ (VθA/VθB)]/n |
| 4 | + | + | > | [(N + 1)*PI/4 − tan$^{-1}$ (VθB/VθA)]/n |
| 5 | + | − | > | [N*PI/4 − tan$^{-1}$ (VθB/VθA)]/n |
| 6 | + | − | < | [(N + 1)*PI/4 + tan$^{-1}$ (VθA/VθB)]/n |
| 7 | − | − | < | [(N*PI/4 + tan$^{-1}$ (VθA/VθB)]/n |
| 8 | − | − | > | [(N + 1)*PI/4 − tan$^{-1}$ (VθB/VθA)]/n |

The resultant rotor position feedback is linear, precise and of high-resolution. Rotor position resolution is dependent on the resolution of the A/D converters 40 and 41 used and is comfortably one/half ($\frac{1}{2}$) electrical degree when 8-bit A/D's are used. This equates to 36,000 increments/revolution for a 1.8-degree step motor and is well suited to high performance motion control applications.

Figure 5:
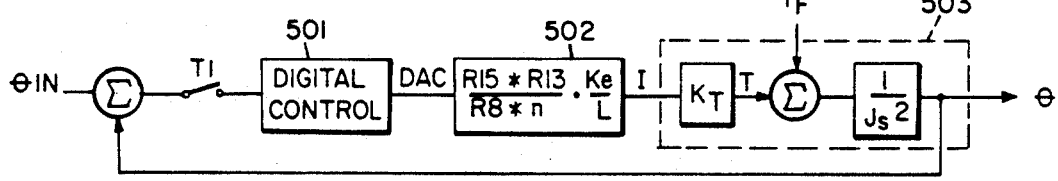
FIG. 5 is a block diagram of one embodiment of a RUN mode servo control.

Furthermore, since all parameters are linearized by the processor 42 and the control circuit of FIG. 2, conventional digital control system analysis and design techniques are used as shown in the simplified block diagram of FIG. 5. The control loop performs the position and velocity servo control tasks and consists of a digital controller 501, a transconductance amplifier 502 and the "plant508". The sample rate of the digital controller 501 (as determined by switch T1) is the service interval of the firmware in the control processor 42. The transconductance amplifier block 502 is the resultant transfer function [R13*R15/(R8*n)]Ke/L of the motor controller shown in the block diagram of FIG. 2. Since the magnitudes of the phase position signals include terms of the motor parameters (Ke/L), the combined tolerances of which can be as much as +/−30%, the control processor 42 scales the phase position signals to a known value. Thus, the torque produced by the motor in response to the applied DAC output voltage is predictable to within the tolerance of the motor's torque sensitivity (Kt). The plant 503 is shown in its simplest form, for the sake of simplicity, and ignores system resonances and non-linear components normally of concern in high performance applications. However, this does not imply any limitation in the ability of the instant invention to compensate for such components.

As the analysis presented above assumes precision in the phase position signals, the aforementioned drift of these signals due to input offset voltage [Vi(os)] and input bias current [I(bias)] of integrator op amp 9 in FIG. 1, must be controlled. This control is accomplished using an active controller implemented by the control processor 42 as shown in FIG. 2. Control signals BIASA and BIASB from control processor 42 are applied to amplifiers 43 and 44, respectively. Amplifiers 43 and 44 are switch-mode transconductance amplifiers with bi-polar outputs, the polarity of which is controlled by the states of BIASA and BIASB, respectively. The outputs of the amplifiers 43 and 44 are applied to the inverting inputs of the integrator op amps 54 and 55 as shown in FIG. 2.

Figure 7:
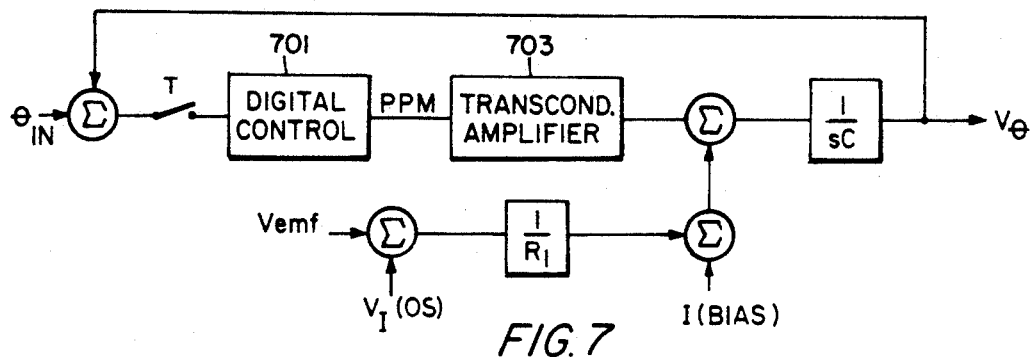
FIG. 7 is a block diagram of one embodiment of a phase position bias control.

A block diagram of each bias control circuit is shown in FIG. 7. The rate of drift of the phase position signal is determined by the DC bias current through the integrator feedback capacitor (C) and is the sum of the currents I(bias), Vi(os)/Ri and the BIAS control signal from the processor.

During the RUN mode the phase position signals (VθA and VθB) are sinusoids, as shown in FIG. 3, whose DC offsets are ideally zero. Thus, the sum of the peaks is also zero. The DC offsets of these signals, due to the undesirable bias current through the integrator capacitor (C), are detected by the control processor by detecting and summing the positive and negative peaks. The processor corrects the DC offset on a cycle-by-cycle basis. Thus, the effective sample period (T) is a function of the motor operating speed. In order to achieve low operating speeds, the uncompensated drift of the integrators is minimized by selecting op amps with low Vi(os) and I(bias). The drifts are further reduced by applying continuous bias control signals (BIASA and BIASB) whose magnitudes are calibrated during system initialization. For most applications this compensation can be achieved using charge pump techniques which are known in the art. The digital controller 701 shown in FIG. 7 for implementation of a charge pump is a pulse position modulator (PPM) whose minimum pulse width is determined by the service interval of the digital controller. This approach improves the responsiveness of the controller without imposing significant voltage ripple to the phase position signals.

The precision attained by the present invention affords the opportunity of commutating the motor directly by the phase position signals which was not possible in the prior art. This arrangement offers significant improvements in performance and efficiency over applications of the prior art in that the motor is commutated with sinewaves (rather than square waves) of excitation current which are in-phase with the torque profiles of the two motor phases. Thus, the torque delivered to the load is controlled by varying the magnitudes (rather than the phases) of the excitation currents.

Since the drift of the phase position signals cannot be detected while the motor is at zero velocity, a HOLD mode is invoked which serves to maintain the motor at a desired position while maintaining the phase position signals which define that position. The HOLD mode exploits the ability of the two-phase brushless DC motor to position itself in accordance with the excitation currents in the two phases. That is, since the torque produced by the motor is the sum of the torques produced by the two phases, the motor can be made to seek a position (nθ) at which the torques produced by the two phases are equal and in opposite directions (at equilibrium). The equilibrium position is uniquely defined by the relative magnitudes of the excitation currents in the two phases. When expressed as sine and cosine functions, a plurality of motor positions (nθ) are defined within each electrical cycle.

Referring to FIG. 3, such equilibrium positions occur where the excitation currents in the two phases lag their respective torque sensitivities by 90 electrical degrees. Thus, if the excitation currents in the two phases (Ia and Ib) are caused to be in position angle agreement with their respective phase position signals (VθA and VθB), then the torques produced by the two phases are at equilibrium. Thus, in the HOLD mode, phase position signal VθA is routed by mode control switch 38 to Ia(IN) via four-quadrant multiplier 34 and VθB to Ib(IN) via four-quadrant multiplier 35. (These multipliers are described infra.) The phase position signals (VθA and VθB) are maintained at their desired voltage levels by the control processor 92 via bias signals BIASA and BIASB, respectively. Then any motor position (θ−θe) which differs from that defined by the phase position signals by a position error (θe) will cause a torque to be produced which tends to return the motor to the desired position.

In the HOLD mode the torque applied to the motor is as expressed in equation 7. It is noted that this last equation is the form given for microstepping, which is appropriate because the current feedback signal for each phase lags the torque profile by 90 electrical degrees.

Figure 6:
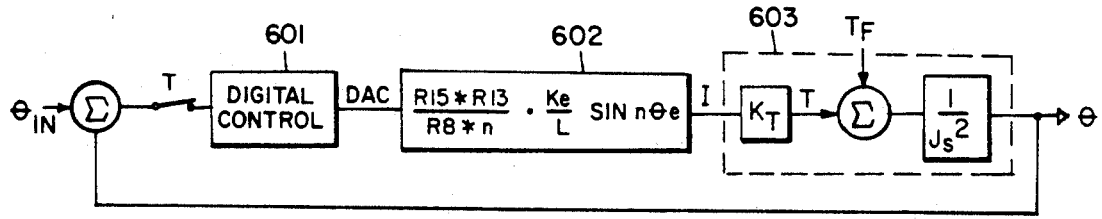
FIG. 6 is a block diagram of one embodiment of a HOLD mode servo control.

The magnitude of torque resulting from the position error is directly proportional to the DAC output voltage from the control processor and the sine of the electrical position error (nθe) as shown in the HOLD mode servo control diagram of FIG. 6. This circuit is conventional and is similar to the circuit diagram of FIG. 5. The circuit consists of a digital controller 601, a transconductance amplifier 602 and a plant 603. The transconductance amplifier 602 exhibits a transconductance which is different from amplifier 502 in FIG. 5, as described above. Otherwise, these circuits are quite similar in operation.

The phase position signals respond, not only to the BIAS signals from the control processor, but also to the back EMF's generated by the motor phases. Therefore, in order to maintain the phase position signals at their desired levels during HOLD mode, the responsiveness of the phase position bias control circuit shown in FIG. 7 must be sufficient to overcome external disturbances to motor position. This circuit includes a digital controller 701, a transconductance amplifier 702 and an output control network. The charge pump technique presented supra is sufficiently responsive for most high performance motion control applications. Since the ripple content and the responsiveness of the phase position signals due to the charge pump are both functions of the sample rate of the control processor (and switch T) and the gain of the transconductance amplifier 702, a compromise must be reached between output ripple voltage and responsiveness, depending on the application. Some applications may require a more expensive solution such as D/A converters.

Figure 8:
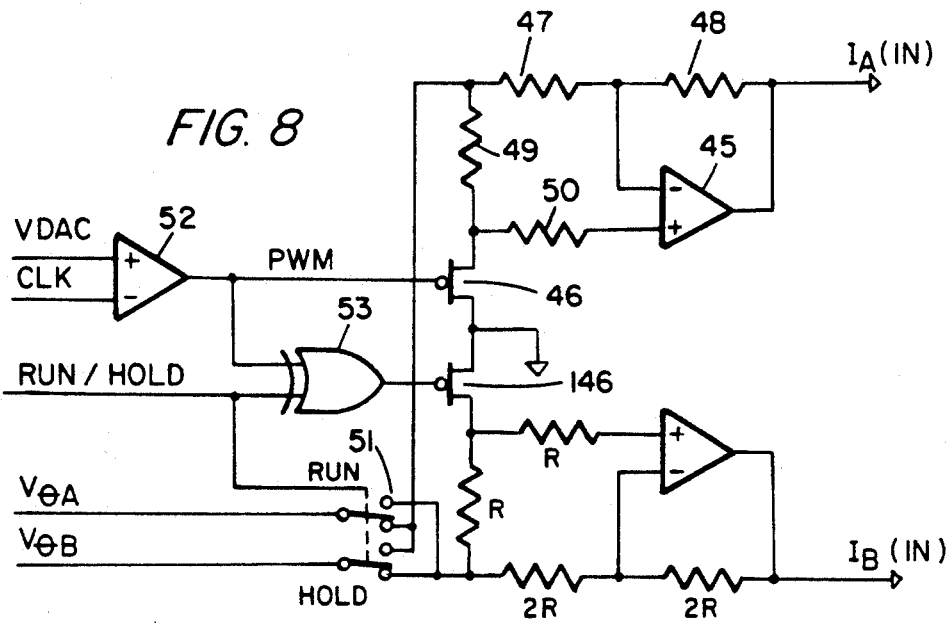
FIG. 8 is a schematic diagram of one embodiment of a mode control, four-quadrant multiplier.

Referring now to FIG. 8, there is shown one embodiment of a four-quadrant multiplier circuits 34 and 35 of the type used in the control circuit shown in FIG. 2. Because the position signals are maintained with a high degree of precision, these signals can be used to commutate the motor with optimal excitation. This is accomplished with a dual four-quadrant multiplier circuit. Four-quadrant multipliers can be implemented using any one of a number of circuits.

The four-quadrant multipliers used in this invention must be of high precision with low offset. Devices of sufficient performance are known in the art. A cost effective dual four-quadrant multiplier which employs pulse width modulation (PWM) is shown in FIG. 8. The circuit makes use of the clock signal CLK required of the SSA's to generate a PWM signal to modulate the phase position signals thereby effecting an attenuation of the signals as controlled by Vdac.

Each multiplier consists of op amp 45, analog switch 46 and resistors 47 through 50, where the ratios of the resistances are such that resistors 49 and 50 are each of resistance value R and resistors 47 and 48 are each of resistance value 2R. This circuit possesses the characteristics of a balanced modulator commonly referred to in the art as a Gilbert cell. For high frequency CLK operation, the op amp 45 must have a high slew rate and analog switch 46 must have low propagation delays.

Figure 9:
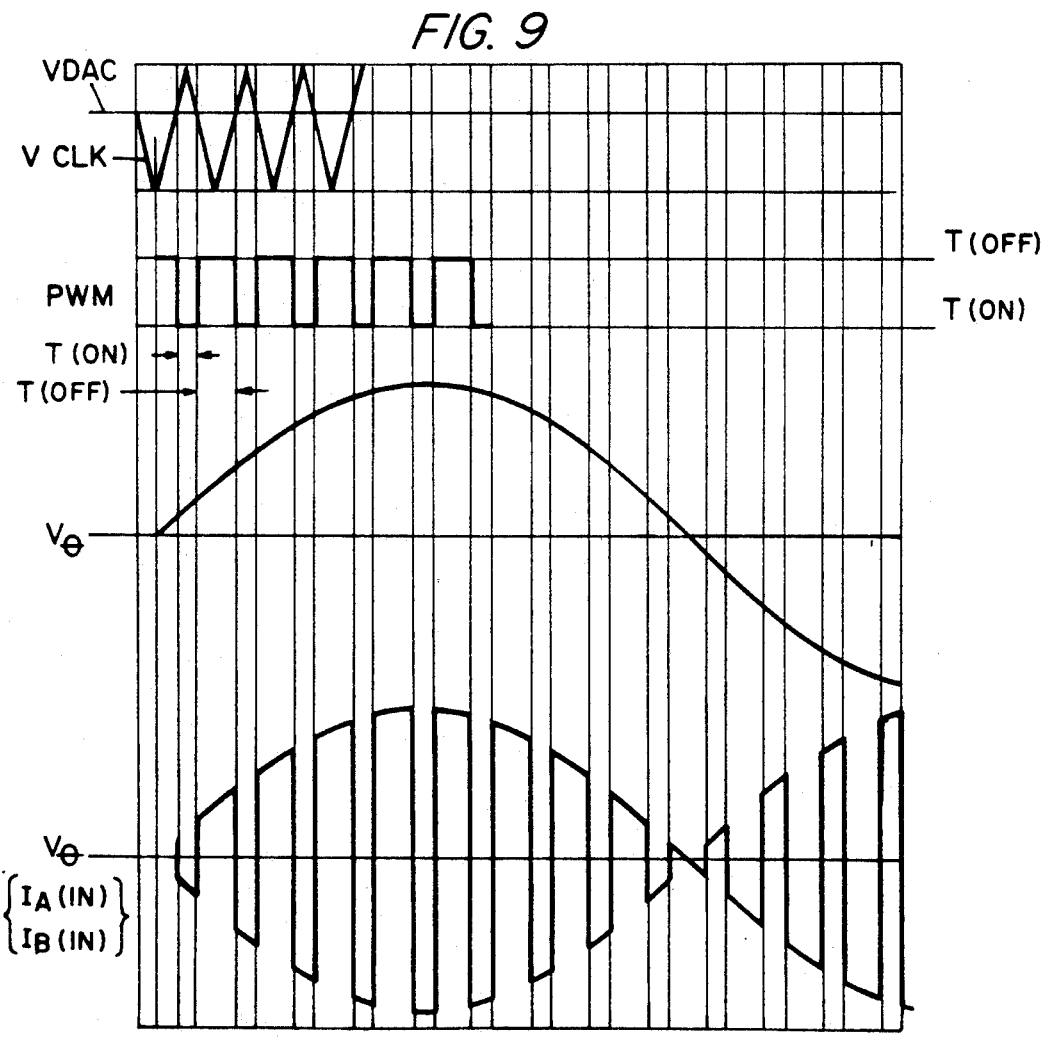
FIG. 9 is a graphic representation of the modulated output waveform.

Referring now to FIG. 9, there are shown the waveforms generated by the circuit. In particular, when the analog switch 46 is closed (Ton), the output voltage of the op amp 45 is the inverse of the input voltage. Alternatively, when the analog switch is open (T-Ton=T-off), the output voltage of the op amp is equal to the input voltage. Therefore, the average output voltage is equal to the input voltage (V$\theta$) times the switching duty cycle of the analog switch, i.e. Vo=VO(2Toff=1)/T. Thus, the outputs of the multipliers have ranges of +VO to −VO. Since the switching frequency is the same as that of the SSA's no filtering is required in addition to that of the SSA filters.

A first input to each of the multipliers is the phase position signals as selected by DPDT analog switch 51 (same as 38 of FIG. 2) which is controlled by the RUN/HOLD signal from the processor 42. The second inputs are the PWM signals developed by comparator 52 and exclusive-OR gate 53. In addition, the RUN/HOLD signal is supplied to an input of gate 53 along with the PWM signal produced by comparator 52. The PWM signal is also supplied to the gate electrode of the FET switch 46. The output of gate 53 is similarly supplied to the gate of the companion FET switch 146 which controls the dual circuit. The source electrodes of the respective FET switches 46 and 146 are connected to ground (or circuit common) to provide a common reference signal source. The PWM signal is provided by the comparator 52 in response to the Vdac and clock (CLK) signals as described above. In other words, the output of the multiplier has a range from VO for a duty cycle of 0 to −VO for a duty cycle of 1.

The analog input (Vdac) from the processor 42 is compared to a triangle-wave CLK signal resulting in a PWM signal whose duty cycle is proportional to Vdac. With the RUN/HOLD signal at logic 1 (RUN mode), the exclusive-OR gate 53 inverts the PWM signal, thus inverting the phase position signal of the trailing phase (VOB) as required. With the RUN/HOLD signal at logic 0, the exclusive-OR gate 53 leaves the PWM signal non-inverted. Thus, as required for HOLD mode operation, neither VOA nor VOB is inverted.

Of course, the microprocessor used with this invention (see FIG. 2) should have the appropriate date and addressing capabilities. Some micro-controllers used in the industry incorporate the A/D and D/A functions therein. Thus, DAC 39 and ADCs 40 and 41 need not be discrete components but could be included within the processor 42, per se.

Thus, there is shown and described a unique design and concept of a two-phase brushless DC motor controller. The particular configuration shown and described herein relates to a control circuit which uses the back EMFs of a 2-phase, brushless DC motor to develop precise rotor position signals. These signals provide feedback to excite the motor with currents designed to deliver torque to the load with optimum efficiency. The invention uses the developed rotor position signals in tandem with a control processor to provide precise, closed-loop control of the position and velocity of the motor. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A motor controller system comprising,
   a motor controller,
   a motor including a drive winding means and a sense winding means,
   said sense winding means transformer coupled to said drive winding means whereby the voltage drop across the resistive component of said drive winding means is removed,
   said motor controller comprising,
   subtracting means for removing the voltage drop across the inductive component of said drive winding means, and
   phase position signal generating means connected to said subtracting means to produce a phase position signal which is an integral of the back EMF voltage of said motor which is controlled thereby.

2. The system recited in claim 1 including,
   feedback means for supplying said phase position signal to said motor controller.

3. The system recited in claim 1 including,
   transconductance amplifiers for receiving said phase position signal in order to control the torque of said motor.

4. The system recited in claim 1 including, current amplifier means connected to each phase of said motor to receive the integrated back EMF and to selectively supply a signal to said phase position signal generating means in order to develop a first torque signal (RUN).

5. The system recited in claim 1 including,
current amplifier means connected to each phase of said motor to receive the integrated back EMF from that phase and to selectively supply a signal to another phase position signal generating means in order to develop a second torque signal (HOLD).

6. The system recited in claim 1 including,
attenuation means for controlling the magnitude of said phase position signal.

7. The system recited in claim 1 including,
polarity means for controlling the polarity of said phase position signal.

8. The system recited in claim 1 wherein,
said motor has a plurality of phases, and
said motor controller including a control circuit having
phase position detector circuit means connected to receive signals from each of said phases,
power amplifier means connected to receive signals from each of said phases,
multiplier means connected to supply signals to said power amplifier means as a function of the operating mode of said control circuit, and
controller means for supplying control signals to determine the operating mode of said control circuit.

9. The system recited in claim 8 wherein,
said phase position detector circuit means comprises,
active integrator means adapted to be connected to the single ended output of said sense winding means of a motor phase,
summing means connected to receive the output signal from said active integrator means and a component of current from said drive winding means of said motor phase, and
output means connected to said summing means to produce an output signal which is independent of motor excitation.

10. The system recited in claim 1 including,
active integrator means adapted to be connected to a single ended output of said sense winding means of said motor,
summing means connected to receive the output signal from said active integrator means and a component of current from said drive winding means of said motor, and
output means connected to said summing means to produce an output signal which is independent of motor excitation.

11. The system recited in claim 1 including,
said motor includes a plurality of drive winding means and a plurality of sense winding means,
said plurality of drive winding means and said plurality of sense winding means arranged in pairs of windings comprising one of each of said drive winding means and one of each of said sense winding means wherein each pair comprises a phase,
phase position detector circuit means connected to receive signals from each of said phases,
power amplifier means connected to receive signals from each of said phases,
multiplier means connected to supply signals to respective ones of said power multiplier means as a function of operating mode of said system, and
controller means for supplying control signals to determine the operating mode of said system.

* * * * *